US012770277B1

(12) United States Patent
Burnett

(10) Patent No.: US 12,770,277 B1
(45) Date of Patent: Oct. 20, 2026

(54) TRACKING SYSTEM FOR GENERATING CONTINUOUSLY TRACKED VIDEO OUTPUT OF MOVABLE OBJECT ALONG PATH

(71) Applicant: MXV Inc., Newark, DE (US)

(72) Inventor: Michael Burnett, Barcelona (ES)

(73) Assignee: MXV Inc., Newark, DE (US)

( * ) Notice: Subject to any disclaimer, the term of this patent is extended or adjusted under 35 U.S.C. 154(b) by 0 days.

(21) Appl. No.: 19/289,932

(22) Filed: Aug. 4, 2025

Related U.S. Application Data

(63) Continuation of application No. 19/259,683, filed on Jul. 3, 2025.

(30) Foreign Application Priority Data

May 30, 2025 (EP) .................................... 25382556

(51) Int. Cl.
*G06T 7/292* (2017.01)
*G06T 5/60* (2024.01)
(Continued)

(52) U.S. Cl.
CPC ................ *G06T 7/292* (2017.01); *G06T 5/60* (2024.01); *G06T 5/70* (2024.01); *G06V 20/40* (2022.01)

(58) Field of Classification Search
CPC ............. G06T 5/60; G06T 5/70; G06T 7/292; G06V 20/52; G06V 20/40; G06V 20/42;
(Continued)

(56) References Cited

U.S. PATENT DOCUMENTS 8,170,277 B2 * 5/2012 Michimoto ............ G06V 10/24
73/488
11,983,927 B1 5/2024 Goyal et al.
(Continued)

FOREIGN PATENT DOCUMENTS

CN 209181784 U 7/2019
CN 112565630 A 3/2021
(Continued)

OTHER PUBLICATIONS

Adzemovic, "Deep Learning-Based Multi-Object Tracking: A Comprehensive Survey from Foundations to State-of-the-Art," arXiv:2506.13457v1 [cs.CV], (Jun. 16, 2025), 39 pages.
(Continued)

*Primary Examiner* — Daniel G Mariam

(57) ABSTRACT

A tracking system for generating a continuously tracked video output of a movable object along a path, comprises a plurality of cameras positioned along the path with fields of view oriented toward the path. The cameras include at least a first camera configured to capture at least a first frame comprising the object and a second camera positioned downstream configured to capture at least a second frame comprising the object at a predetermined time interval. A control system is configured to receive frames from the cameras and compile a continuous video output comprising frames from multiple cameras in temporal sequence. Camera positioning is determined based on expected object velocity characteristics and a desired frame rate for seamless tracking without mechanical camera movement.

18 Claims, 3 Drawing Sheets

(51) Int. Cl.
*G06T 5/70* (2024.01)
*G06V 20/40* (2022.01)

(58) Field of Classification Search
CPC .................. G06V 20/58; G06V 40/20; H04N 21/21805; H04N 23/90; H04N 5/144
See application file for complete search history.

(56) References Cited

U.S. PATENT DOCUMENTS

| | | | | |
|---|---|---|---|---|
| 12,033,348 | B1 | 7/2024 | Cao et al. | |
| 12,039,781 | B2 | 7/2024 | Goyal et al. | |
| 12,067,755 | B1 | 8/2024 | Nan et al. | |
| 12,254,686 | B2 | 3/2025 | Mwaura et al. | |
| 12,260,491 | B2 | 3/2025 | Fukuyasu | |
| 2008/0192116 | A1 | 8/2008 | Tamir et al. | |
| 2008/0303901 | A1 | 12/2008 | Variyath et al. | |
| 2009/0041298 | A1 | 2/2009 | Sandler et al. | |
| 2011/0228092 | A1* | 9/2011 | Park | H04N 19/157 348/154 |
| 2012/0162436 | A1 | 6/2012 | Cordell et al. | |
| 2015/0063775 | A1 | 3/2015 | Nakamura et al. | |
| 2015/0147047 | A1* | 5/2015 | Wang | G06T 5/73 386/280 |
| 2017/0094259 | A1* | 3/2017 | Kouperman | H04N 13/111 |
| 2018/0167553 | A1 | 6/2018 | Yee et al. | |
| 2018/0359427 | A1 | 12/2018 | Choi | |
| 2019/0083885 | A1 | 3/2019 | Yee | |
| 2019/0132529 | A1 | 5/2019 | Ito | |
| 2019/0174122 | A1 | 6/2019 | Besley | |
| 2019/0259199 | A1 | 8/2019 | Yee et al. | |
| 2021/0241518 | A1 | 8/2021 | Tong et al. | |
| 2022/0417441 | A1 | 12/2022 | Voelker et al. | |
| 2023/0186628 | A1 | 6/2023 | Li et al. | |
| 2023/0316659 | A1* | 10/2023 | Senapathy | G06T 19/006 345/419 |

FOREIGN PATENT DOCUMENTS

| | | | |
|---|---|---|---|
| CN | 113114950 | A | 7/2021 |
| CN | 114004773 | A | 2/2022 |
| CN | 114401378 | A | 4/2022 |
| CN | 115174850 | A | 10/2022 |
| DE | 102005033853 | B3 | 8/2006 |
| EP | 4109893 | A1 | 12/2022 |
| JP | H06325180 | A | 11/1994 |
| JP | 2011130323 | A | 6/2011 |
| JP | 2016219968 | A | 12/2016 |
| JP | 2017163245 | A | 9/2017 |
| RU | 2706576 | C1 | 11/2019 |
| WO | WO-2019021375 | A1 | 1/2019 |
| WO | WO-2023196203 | A1 | 10/2023 |

OTHER PUBLICATIONS

Audi, "Meet the Audi RS 3 Sedan?," [video], Youtube.com, (Nov. 18, 2024). [Retrieved from the Internet on Oct. 10, 2025 at URL: https://www.youtube.com/watch?v=YRR25-QgoQc&t=53s], PDF of Video Screenshot Provided, 6 pages.

Chen et al., "A Robust Billboard-based Free-viewpoint Video Synthesizing Algorithm for Sports Scenes," arXiv:1908.02446v1 [cs.MM], (Aug. 7, 2019), 10 pages.

Disney Research, "Algorithm combines videos from unstructured camera arrays into panoramas," [online], Phys.org, (May 4, 2015). [Retrieved from the Internet on Mar. 8, 2025 at URL: https://phys.org/news/2015-05-algorithm-combines-videosunstructured-camera.html], 3 pages.

EP Application No. 25194315.5, Extended European Search Report mailed Oct. 22, 2025, Applicant MXV Inc., 11 pages.

EP Application No. 25382556.6, Extended European Search Report mailed Nov. 13, 2025, Applicant MXV Inc., 10 pages.

Formula One World Championship Limited, "Highlights: Watch the Action As Piastri Takes Chinese Grand Prix Victory in McLaren 1-2," [video], Formula1.com, (Mar. 23, 2025). [Retrieved from the Internet on Oct. 10, 2025 at URL: https://www.formula1.com/en/latest/article/highlights-watch-the-action-as-piastri-takes-chinese-grand-prix-victory-in.4oxnfp2ko03MjHTvkqwloH], PDF of Video Screenshot Provided, 18 pages.

Lin et al., "Line-preserving video stitching for asymmetric cameras," Multimedia Tools and Applications, 78:14591-14611, (Epub Nov. 12, 2018; published Jun. 15, 2019).

Olympics, "Alpine Skiing Beijing 2022 | Men's downhill highlights," [video], Youtube.com, (Feb. 7, 2022). [Retrieved from the Internet on Oct. 10, 2025 at URL: https://www.youtube.com/watch?v=iZ-W2oEZfVg], PDF of Video Screenshot Provided, 13 pages.

Park et al., "Multi-Frame Based Homography Estimation for Video Stitching in Static Camera Environments," Sensors, (Epub Dec. 22, 2019; published Jan. 1, 2020), 20(1):92, 17 pages.

Red Bull, "World's Fastest Camera Drone Vs F1 Car (ft. Max Verstappen)," [video], Youtube.com, (Feb. 27, 2024). [Retrieved from the Internet on Oct. 10, 2025 at URL: https://www.youtube.com/watch?v=9pEqyr_uT-k&t=573s], PDF of Video Screenshot Provided, 25 pages.

U.S. Appl. No. 19/290,059, Non-Final Office Action mailed Sep. 29, 2025, Inventor Burnett, 19 pages.

Wikipedia, "Camera dolly," [online encyclopedia], Wikipedia.org, (initial publication date unknown; last edited Jan. 15, 2025, at 19:04 (UTC)). [Retrieved from the Internet on Oct. 6, 2025 at URL: https://en.wikipedia.org/wiki/Camera_dolly], 2 pages.

Wikipedia, "Cut (transition)," [online encyclopedia], Wikipedia.org, (initial publication date unknown; last edited Aug. 4, 2025, at 03:14 (UTC)). [Retrieved from the Internet on Oct. 6, 2025 at URL: https://en.wikipedia.org/wiki/Cut_(transition)#:~:text=In%20the%20post%2Dproduction%20process,number%20of%20transitions%20or%20effects], 2 pages.

Wikipedia, "Panning (camera)," [online encyclopedia], Wikipedia.org, (initial publication date unknown; last edited Feb. 27, 2023, at 00:15 (UTC)). [Retrieved from the Internet on Oct. 6, 2025 at URL: https://en.wikipedia.org/wiki/Panning_(camera)], 1 page.

* cited by examiner

TRACKING SYSTEM FOR GENERATING CONTINUOUSLY TRACKED VIDEO OUTPUT OF MOVABLE OBJECT ALONG PATH

CROSS-REFERENCE TO RELATED APPLICATIONS

This application is a continuation of U.S. patent application Ser. No. 19/259,683, filed Jul. 3, 2025, which claims priority from European Patent Application No. 25382556.6, filed May 30, 2025, the disclosure of which are incorporated herein by reference in their entirety.

FIELD OF THE INVENTION

The present invention relates to video capture systems, especially those designed for synchronized multi-camera arrays where moving objects are tracked to produce seamless, continuous video footage of the objects.

BACKGROUND OF THE INVENTION

For broadcasting of high-speed competitions such as motor sports (for example, Formula 1) and winter sports (for example, skiing) there are limited recording systems used to follow and record a participant or a group of participants as the participants move through predefined paths or racing circuits. The object of these recording systems is to produce seamless continuous shot of the participant or participants as the participants travel along the predefined paths. High-speed sports, as referred to herein, are considered as those where maximum speeds exceed the maximum speed a human can reach without the aid of external devices, that is, the maximum human sprinting speed which is approximately 45 km/h.

Current tracking and recording systems fall into several categories, each with significant limitations. Traditional fixed camera systems provide only static coverage of limited field segments, requiring switching between cameras and resulting in discontinuous coverage when objects move between camera zones. Pan-tilt-zoom (PTZ) systems attempt to follow moving objects through mechanical camera movement, but suffer from mechanical lag, positioning errors, and the inability to predict optimal viewing angles for fast-moving objects.

Automated sports broadcasting systems have emerged, but these typically rely on wide-angle panoramic cameras that capture entire playing fields simultaneously. While these systems can digitally zoom and crop regions of interest, they sacrifice image quality and detail resolution, particularly for high-speed objects requiring close-up coverage. All of these systems use stationary cameras and fail to give viewers the sensation of movement along with the subjects of the sporting events.

The current recording systems employed to produce seamless video recordings of specific participant or participants along predefined paths include a camera on a flying device, for example, a helicopter or drone. The flying devices fly along the predefined path and the camera is oriented such that the field of view contains the desired participant or participants. As these recording systems travel along predefined path following the desired participant or participants, seamless videos can be produced for the viewer.

However, the aforementioned recording systems suffer from three primary limitations. Firstly, there is the high-cost of the flying devices and in case of using a helicopter or similarly manned-aircraft this cost is increased by the cost of the pilot salary. Secondly, the safety of the participants may be compromised if there is a loss of control of the flying devices and the devices fall onto the predefined path or the devices collide with the participants. Such a scenario could result in cancelling of the event, participant injury and/or loss of life. To avoid any accidents, the flying devices operate at significant distances from the participants. Thirdly, it is very difficult for the flying devices to follow the participant or participants such that a similar trajectory is defined by both the flying device and participant or participants. Additionally, other drawbacks of flying devices could be the ones derived from difficult weather situations or places difficult to access, for example, tunnels. As such, the viewing angle of the participant or participants taken by the camera in the continuous shot varies along the path making it difficult to produce a subject-mounted perspective effect which is often desired by viewers.

There is an evident need for a system that can overcome the aforementioned limitations such that the effect of a continuous shot of the participant or participants is maintained through cheaper and safer means. Additionally, there is a need to provide a system that can not only provide a continuous shot effect but also a subject-mounted perspective effect to improve the viewer experience. Specifically, there is a need for a system that can create the visual effect of a camera following or "flying" at the same speed as the moving object, similar to drone or helicopter footage, while using only stationary cameras along the path. A stationary camera as referred to herein may be considered a camera that is positioned at specific fixed location along a path.

SUMMARY OF THE INVENTION

To address the above-identified needs, the present invention provides a tracking system and a method for generating a continuously tracked video output of a movable object along a path as disclosed herein. The invention creates a visual effect of a camera following the object along its path, similar to aerial drone footage, while using an array of strategically positioned stationary cameras rather than moving cameras or flying devices.

An exemplary embodiment of a tracking system for generating a continuously tracked video output of a movable object along a path, comprises:

- a plurality of cameras positioned along the path, each camera having a field of view oriented toward the path;
- at least a first camera of the plurality of cameras configured to capture at least a first frame containing the object;
- at least a second camera positioned downstream from the first camera along the path and configured to capture at least a second frame containing the object at a predetermined time interval after the first frame;
- additional cameras of the plurality of cameras positioned along the path and configured to capture additional frames as the object moves along the path; and
- a controller configured to receive frames from the plurality of cameras and compile a continuous video output comprising frames from multiple cameras in temporal sequence, wherein consecutive frames in the video output are captured by different cameras positioned sequentially along the path;

wherein positioning of the cameras along the path is determined based on expected velocity characteristics of the object and a desired frame rate for the video output.

A computer-implemented method for generating a continuously tracked video output of a movable object along a path may comprise the steps of:

positioning a plurality of stationary cameras along the path at predetermined intervals calculated based on expected object velocity and desired frame rate, wherein each camera is positioned to capture the object during a specific time window as the object travels along the path;

synchronizing frame capture timing across the plurality of cameras;

configuring each camera to capture a single frame or limited number of frames containing the object as the object passes through the respective camera's field of view, wherein consecutive frames in the output video are captured by different cameras positioned sequentially along the path;

receiving frame data from the plurality of cameras in temporal sequence corresponding to the object's movement along the path;

identifying the object within captured frames using image processing techniques;

compiling a seamless video sequence wherein substantially each frame is captured by a different camera positioned along the path, creating a continuous tracking effect through sequential frame selection from different cameras rather than camera movement; and outputting the compiled video sequence as a continuous tracking video that simulates following the object along the path.

A non-transitory computer-readable storage medium may store instructions that, when executed by a processor, cause the processor to perform operations may comprise the steps of:

receiving video frame data from a plurality of cameras positioned along a path at predetermined intervals calculated based on expected object velocity and desired frame rate;

analyzing the frame data to identify a target object within frames using computer vision processing;

determining optimal frame selection timing based on object movement and frame rate requirements;

compiling selected frames from different cameras into a continuous video sequence that provides seamless tracking of the object; and generating output video data in a format suitable for broadcasting or display.

Additionally, the computer-readable storage medium can further comprise the following steps:

monitoring real-time object velocity and comparing to predicted velocity values;

dynamically adjusting camera selection based on velocity variations; and applying quality assessment algorithms to optimize frame selection for video compilation.

An object as referenced herein is any moving body, such as a motor sport vehicle or an athlete that moves faster than the fastest runner on earth (e.g., a professional downhill ski racer). The object may also include any vehicle, person, animal, or device moving along a defined path at any speed, including but not limited to bicycles, motorcycles, boats, aircraft, robotic devices, or any combination thereof. The system is particularly advantageous for objects moving at speeds exceeding human running capability, but is not limited to such high-speed applications.

TA continuous tracking visual effect may be created that simulates a camera following or "flying" alongside a moving object, without requiring any actual camera movement or flying devices. This is achieved through precise mathematical positioning of stationary cameras along the path, where each camera captures the object at predetermined intervals corresponding to the desired video frame rate. The resulting compiled video provides viewers with the same visual experience as drone or helicopter tracking footage, but with superior safety, cost-effectiveness, and positioning accuracy.

Unlike existing systems that either use moving cameras with inherent mechanical limitations or static wide-angle cameras that digitally crop action, the a mathematical relationship $D=V\times T$ may be used to position cameras such that consecutive video frames are captured by different cameras positioned sequentially along the path, where D represents predetermined distance between cameras along the path, V represents expected object velocity, and T represents time frame corresponding to the desired frame rate. This creates a seamless "following" effect where the viewpoint appears to travel alongside the object at a consistent distance and angle, replicating the visual experience of aerial tracking without the associated costs and safety risks.

In a particular embodiment of the invention, the plurality of cameras comprises photosensitive cameras for capturing images or video by recording light onto a photosensitive surface comprised by each camera. The cameras may be digital cameras, infrared cameras, high-speed cameras, or any combination thereof suitable for the intended application and environmental conditions.

It should be noted that as the object travels along the path, the tracking system of the invention is configured to provide a video, which comprises a continuous supply of single frames in which the object is displayed, and which are captured by different cameras of the plurality of cameras. As disclosed herein, within the plurality of cameras, at least the first camera and the second camera are separated along the path at a predetermined distance which depends partly on the desired projection system on which the selected captured frames will be projected and the expected velocity characteristics of the object.

The predetermined distance between consecutive cameras is calculated using the relationship $D=V\times T$, where D represents the distance between camera optical axis intersection points with the path, V represents the expected velocity of the object at the downstream camera location, and T represents the time frame corresponding to the desired frame rate. This relationship ensures that as the object moves from one camera's field of view to the next, the timing corresponds precisely to the required frame intervals for seamless video compilation that creates the visual effect of continuous following.

For applications requiring variable frame rates or adaptive tracking, the system may dynamically adjust camera selection and timing based on real-time velocity measurements. The system may also incorporate predictive algorithms that account for acceleration, deceleration, and directional changes of the object along the path.

Camera positioning may be optimized for specific path geometries, including straight sections, curves, elevation changes, and complex three-dimensional paths. For curved sections, camera positioning accounts for centripetal motion effects and may include additional cameras to maintain consistent coverage through turning segments.

More specifically, different projection systems may have different frame rates. For example, traditional film projectors can use 24 frames per second (fps), some television systems can use 30 fps or 60 fps, while modern digital projection systems can support 120 fps or higher, including variable frame rate systems and future projection technologies. The inverse of the frame rate (frames per second) is commonly referred to in the state of the art as the time frame (seconds per frame). Considering the previous example frame rates, the time frame for traditional film would be 1/24 seconds per frame, for television systems the frame rate would be 1/30 or 1/60 seconds per frame and for modern digital systems the frame rate would be 1/120 seconds per frame. There also exist shorter time frames than those described, such as, for slow-motion projection systems and emerging high-speed display technologies.

With regard to the placement of the plurality of cameras, in a particular embodiment, the field of view of each camera is oriented towards the path in order to capture accurately a frame in which the object is displayed. The orientation may be fixed or adjustable, and may include remote control capabilities for fine-tuning camera angles during operation. Multiple cameras may be positioned at similar path locations but with different viewing angles to provide alternative perspectives or backup coverage.

It should be noted that the first frame taken by the first camera can be considered to define a $t_0$. The second frame captured by the second camera is captured within a time frame T from $t_0$, where the time frame T is defined by the desired projection system. In this way, each camera is configured to provide one frame in which the object appears as the object travels along the path and moves by the first camera, the second camera, and additional cameras.

In an exemplary embodiment, the predetermined distance is based on the expected speed of the object along the path and the time frame.

In an exemplary embodiment, camera positioning may be determined through fixed installation methods using historical data analysis.

Historical velocity data analysis, such as, average speeds and acceleration patterns from previous events or similar objects, are used to optimize fixed camera placement along the path. This method involves positioning cameras at predetermined locations calculated using the relationship $D=V\times T$, where cameras remain in fixed positions throughout operation. For optimal coverage, cameras may be positioned with overlapping fields of view to ensure seamless object capture even when actual object velocity varies from predicted values. This fixed positioning approach provides the most cost-effective and reliable implementation, particularly suitable for recurring events, such as, racing circuits where historical performance data enables accurate camera placement optimization.

In exemplary embodiments requiring enhanced adaptability, the system may incorporate mechanical positioning adjustments, including, but not limited to:

- real-time adaptive positioning, where camera positions along the path can be mechanically adjusted based on instantaneous velocity measurements from computer vision analysis of object movement or dedicated timing sensors. This embodiment requires cameras mounted on mechanical positioning systems, such as movable tracks or adjustable mounting platforms, enabling physical repositioning of cameras along the path during or between tracking operations;
- predictive modeling with mechanical adjustment, where cameras can be repositioned using mechanical systems based on predictive algorithms that incorporate factors such as path geometry, object characteristics, and driver/operator behavior. This embodiment provides maximum flexibility but requires additional mechanical infrastructure for camera repositioning;
- multi-speed optimization with selective camera activation, where a comprehensive fixed camera array is designed to accommodate objects moving at different velocities, with the controller selectively activating or utilizing specific cameras from the array based on real-time object speed measurements. This approach combines the reliability of fixed positioning with the adaptability of selective operation; and
- machine learning algorithms may be employed to analyze tracking performance and optimize camera positioning parameters, whether for future fixed installations or for mechanical repositioning systems, based on successful tracking outcomes and image quality metrics.

In this regard, two variables that affect the predetermined distance are the time frame T and the expected speed or average speed of the object as the object travels past a camera, where the object defines a direction of travel along the path. To initiate establishing a predetermined distance a starting location on the path from which to calculate the predetermined distance can be chosen, either arbitrarily, or, as a point of interest. As an example, a first camera can be positioned separated from the starting location on the path and oriented essentially pointing to the path. Preferably, the first camera can be positioned separated from the starting location on the path and oriented such that an optical axis of the first camera intersects the path at the chosen starting location, thus forming a first intersection point.

As used herein, and for the sake of the clarity, the feature "optical axis" can be defined as an imaginary straight line that defines the path along which light travels through an optical system, such as a lens or a set of lenses of the camera, the optical axis normally passes through the centers of curvature of the optical elements (e.g., lenses or mirrors) and is the line of symmetry for rotationally symmetric systems. Also, optical axis can be understood as the imaginary axis that passes through the geometric center of the field of view of each camera.

Next, the expected speed of the object downstream the first intersection point is estimated. To this end, for example, in Formula 1 races, the displacement with respect to time can be modelled. This model can take into account constant acceleration, jerk (first derivative of acceleration), snap (second derivative of acceleration), and so on, that is, integral kinematics. Other methods for predicting the expected speed of objects can be used including, but not limited to, computer vision analysis, machine learning predictions, and historical data analysis.

Based, for example, on the displacement model, the expected speed of the object for a given time frame T downstream the first intersection point can be calculated. With the expected speed of the object predicted downstream the first intersection point and the time frame T, a predetermined distance along the path from the first intersection point at which a second camera optical axis intersection point with the path should be defined can be determined. The second camera is then placed along the path such that optical axis of the second camera intersects the path forming the second camera optical axis intersection point. This process is then carried out iteratively along the entire path until sufficient cameras are in place such that each camera is configured to capture at least one frame that displays the object at a time defined by a multiple of the desired time frame T.

More generally, with the first intersection point defined and the model for estimating expected objects speeds, the predetermined distances for where subsequent camera optical axis intersections with the path should be formed can be predicted. Each new camera optical axis intersection point with the path to be defined is distanced from an upstream camera optical axis intersection point with the path that has already been defined by a predetermined distance along the path. The predetermined distance is based on the expected speed downstream the defined camera optical axis intersection point with the path, during the time frame T, and is measured along the path from the defined camera optical axis intersection point with the path in the direction of travel.

In an alternative embodiment, the expected speed of the object is predicted by using the historical average speed data of the object along the path, and the distance between consecutive cameras in the direction of travel is calculated in the same way as described in the previous paragraph.

For example, in Formula 1, an initial straight sector of the circuit could be covered by a first array of eight cameras where one camera is placed at the pole position which would be considered a point of interest and oriented such that its optical axis defines an intersection point with the path. In this scenario, with eight cameras, Table I below shows an offset of predetermined distances between consecutive camera optical axis intersection points with the path for a projection system frame rate of 30 fps and example expected speeds or average speeds of the vehicle from the race start, where the vehicle race start speed is 0 meters per second (m/s). The time column represents multiples of the time frame, 1/30 seconds per frame (0.033 seconds per frame), of the projection system. The predetermined distances for each camera optical axis intersection point with the path is given as the distance along the path with respect to the closest camera optical axis intersection point with the path upstream the direction of travel of the vehicle. Camera I has been chosen to be situated at the pole position, as such, the camera I optical axis has been configured to intersect the starting location on the path. The camera I optical axis intersection point with the path has no predetermined distance with respect to any other camera optical axis intersection point with the path and acts as the reference point from which to calculate a predetermined distance along the path of a camera II optical axis intersection point with the path. Analogously, the camera II optical axis intersection point with the path acts as the reference point for calculating a predetermined distance along the path of a following camera Ill optical axis intersection point with the path, and so forth with the remaining cameras IV-VIII.

TABLE I

| Camera | Time (s) | Expected Speed (m/s) | Predetermined distances (m) |
|---|---|---|---|
| I | 0.000 | 0.00 | N/A |
| II | 0.033 | 0.56 | 0.018 |
| III | 0.067 | 1.11 | 0.037 |
| IV | 0.100 | 1.67 | 0.055 |
| V | 0.133 | 2.23 | 0.074 |
| VI | 0.167 | 2.78 | 0.092 |
| VII | 0.200 | 3.34 | 0.110 |
| VIII | 0.233 | 3.90 | 0.129 |

It may occur that the object does not follow the displacement model correctly, that is, that the object travels less distance than initially modeled (e.g., lower than expected speed) or more distance than initially modeled (e.g., higher than expected speed). When the object travels less distance or slower than expected, the first frame and second frame may be taken by the same camera. When the object travels more distance or faster than expected the second frame may be taken by a camera that is not consecutively downstream from the first camera that takes the first frame. For example, referring to the eight-camera example for Formula 1, when the vehicle travels slower than expected between camera II and camera III, camera II will take two frames of the object within a time frame, and when the vehicle travels faster than expected between camera II and camera III, camera II takes the first frame and camera IV takes the second frame within the time frame.

To address velocity variations, the controller may incorporate adaptive tracking algorithms that monitor object velocity in real-time and dynamically select appropriate cameras for frame capture. This may include:

- velocity monitoring systems using computer vision analysis or timing sensors to track actual object speed and compare it to predicted values;
- dynamic camera selection algorithms that choose optimal cameras based on real-time position and velocity data, ensuring continuous coverage even when objects deviate from expected speed profiles;
- predictive buffering systems that capture frames from multiple cameras simultaneously and select the optimal frame sequence during post-processing or real-time compilation; and
- machine learning systems that improve velocity prediction accuracy over time by analyzing tracking performance and adjusting algorithms based on observed object behavior patterns.

The previous Formula 1 example for eight-cameras along the initial straight sector of a race demonstrates how camera optical axis intersection points with the path would be separated by gradually increasing distances as the expected speed of the object gradually increases. In Table II, below, another scenario has been provided where the object travels at a constant speed in a straight portion of the path covered by five cameras. Throughout the straight sector the expected speed is predicted to be a constant 108 km/h for each time frame downstream each respective camera optical axis intersection point with the path. As it is not the beginning of the race, an arbitrary time $t_s$ will be taken into account as the time at which camera I captures a first frame where the object is displayed. Additionally, an expected speed for the time frame between a nearest upstream camera from camera I (not considered in Table II) will not be defined, and, as such, the predetermined distance of the camera I optical axis intersection point with the path with respected to a nearest upstream camera optical axis intersection point with the path is not defined.

TABLE II

| Camera | Time (s) | Expected Speed (m/s) | Predetermined distances (m) |
|---|---|---|---|
| I | $t_s$ | Undefined | Undefined |
| II | $t_s + 0.033$ | 30.0 | 1 |
| III | $t_s + 0.067$ | 30.0 | 1 |
| IV | $t_s + 0.100$ | 30.0 | 1 |
| V | $t_s + 0.133$ | 30.0 | 1 |

In an exemplary embodiment, the predetermined distance is the product between the expected speed of the object along the path and the time frame. In other words, this is the equation applied in order to calculate the predetermined distances downstream each respective camera optical axis intersection point with the path within the time frame. Given this relationship, the total number of cameras of the tracking system will depend on the length of the path and the cumulative number of predetermined distances needed for the camera optical axis intersection points with the path.

In a particular embodiment of the invention, the controller comprises an AI model configured to identify the object within at least the first frame and the second frame.

It should be noted that the AI model can be trained to detect the object within at least the first frame and the second frame. The AI model can be powered by computer vision algorithms and neural networks, in order to provide a more accurate identification of the object within the respective frame. Sometimes a captured frame may contain a plurality of objects when the objects are moving at similar expected speeds. The AI model may be configured to identify each one of the plurality of objects displayed in each respective frame captured by the plurality of cameras and track a desired object among the plurality of objects in order to produce an output video of the desired object. The AI model also enables to system to track individual objects across multiple camera views.

The AI model may incorporate advanced features including, but not limited to:

- real-time object identification, capable of distinguishing between different types of objects, participants, or vehicles within the same frame;
- predictive algorithms that anticipate object movement and optimize camera selection for frame capture timing;
- multi-object tracking capabilities that simultaneously track multiple participants and generate separate continuous video outputs for each tracked object;
- adaptive learning systems that improve tracking accuracy over time by analyzing successful tracking patterns and adjusting detection parameters accordingly;
- environmental adaptation algorithms that adjust detection parameters based on lighting conditions, background complexity, and other environmental factors;
- quality assessment systems that evaluate frame quality, focus, and composition to select optimal frames for video compilation; and
- video enhancement processing that may apply motion blur effects to background areas surrounding the tracked object while maintaining focus on the tracked object, thereby creating a more realistic sensation of movement and enhancing the visual effect of following the object along the path.

More specifically, when the tracking system is required to track two or more objects there are various solutions that can be employed. These solutions allow the tracking system to produce multiple output videos for multiple tracked objects, that is one output video per tracked object.

A first solution could consist in situating along the path a specific array of cameras for each object expected speed or desired frame rate. This solution is particularly useful if the expected speeds of each object are substantially different and would not require the use of an AI model as the configuration of the camera optical axis intersection points with the path according to the predetermined distances ensures that, when the objects travel as modeled, each object is displayed within one frame captured by the plurality of cameras.

A second solution could consist in situating along the path an array of cameras, with their respective camera optical axis intersection points with the path, where the predetermined distances are calculated for the object that travels the slowest of the two or more objects. As the distance between cameras would be smaller with respect to the distances between cameras if the cameras had been arranged for any of the other faster objects, a continuous shot effect for all the objects is ensured.

In an exemplary embodiment, the AI model is used to assist in the capturing of frames when the actual speed of the two or more objects deviates from the predicted expected speed. This enables the tracking system to generate continuous shot effect output videos for any of the camera configurations along the path thus far described. Additionally, as the AI model tracks objects from one frame to another object speed can be estimated and advance notice can be given to the system about where to expect the objects within upcoming frames. This will enable speeding up of processing time for object recognition withing frames.

In the most common sport scenario where the two or more objects to be identified are travelling at substantially similar expected speeds, sometimes the captured frames will include more than one object to be identified. For that reason, a third solution could be based on using the AI model to identify each one of the objects within the frames. With each object identified, zoom/crop, and other frame manipulating techniques, could be used to generate output videos for each object such that a continuous video effect could be achieved.

In an exemplary embodiment, the optical axis of the at least the first camera or the second camera is configured to be oriented at a predefined angle with respect to the path.

In an exemplary embodiment, the plurality of cameras and their respective optical axes are oriented at a constant predetermined angle with respect to the path. Alternatively, the optical axes may be oriented at varying angles optimized for specific path segments, viewing requirements, or environmental constraints. The system may support both fixed and adjustable camera orientations, including, but not limited to, remote-controlled positioning systems for dynamic angle adjustment during operation. As stated above, the axis that passes through the geometric center of the field of view of each camera is referred to as the optical axis, and each optical axis is preferably oriented such that the optical axis forms a consistent angle with respect to the path from a subject-mounted perspective. This type of orientation, when each of the cameras of the plurality of cameras is placed along the path on one specific side, can allow the generation of output videos that achieve a continuous shot effect and a subject-mounted perspective effect perpendicular to the object, similar to a dolly camera travelling parallel to the object along the path. The cameras may also be positioned on multiple sides of the path, above the path, or in elevated positions to provide varied perspective options and enhanced coverage flexibility.

The system may support multiple viewing perspective modes including, but not limited to:

- side-view tracking, where cameras are positioned laterally to the path to provide profile views of the object as it moves along the path;
- overhead tracking, where cameras are positioned above the path to provide bird's-eye view tracking, particularly useful for tactical analysis and path visualization;
- multi-angle tracking, where multiple camera arrays positioned at different angles simultaneously capture the object, enabling the generation of multiple perspective video outputs or composite views;
- dynamic perspective switching, where the viewing angle changes along the path to optimize viewing experience for different path segments or events; and three-dimensional tracking, where stereo camera pairs or multiple cameras provide depth information and enable three-dimensional visualization of object movement.

Regarding optical axis orientation, it is beneficial to define a global universal coordinate system (UCS) with the origin (0,0,0) of the optical axis centered at a point of interest, for example, the starting line or finish line of a race track. The XY plane of the global UCS defines a horizontal plane and the z-axis defines the elevation. Additionally, each camera optical axis can be considered to extend from a lens geometric center, and, at each lens geometric center the origin of a local UCS with the same orientation as the global UCS is centered. Each optical axis defines a unit optical axis direction vector and the direction of travel defines a continuous set of unit direction of travel vectors at each optical axis intersection point.

Under these circumstances, in an exemplary embodiment, each optical axis is oriented such each unit optical axis direction vector forms an acute angle with each corresponding unit direction of travel vector defined at each intersection point. This orientation ensures that as an object travels past each optical axis intersection point a rear part of the object is visible. For example, in Formula 1, the rear part of the vehicle would be visible. Preferably, the acute angle formed between each unit optical axis direction vector and its corresponding unit direction of travel vector is constant. This orientation would generate a continuous shot effect where the vehicle is viewed from behind as the vehicle advances in the direction of travel.

In another embodiment, each optical axis is oriented such each unit optical axis direction vector forms an obtuse angle with each corresponding unit direction of travel vector defined at each intersection point. This orientation ensures that, as an object travels past each optical axis intersection point, a front part of the object is visible. For example, in Formula 1, the front part of the vehicle would be visible. Preferably, the obtuse angle formed between each unit optical axis direction vector and its corresponding unit direction of travel vector is constant. This orientation would generate a continuous shot effect where the vehicle is viewed from in front as the vehicle advances in the direction of travel.

In either of two embodiments of the previous two paragraphs, if the optical axis is oriented with an elevation with respect to its corresponding intersection point, that is the corresponding intersection point has a negative z greater than a height of the object, a top-rear view would be achieved when an acute angle is formed between each unit optical axis direction vector and each corresponding unit direction of travel vector and a top-front view would be achieved in the case of an obtuse angle formed between each unit optical axis direction vector and each corresponding unit direction of travel vector.

Thus, the plurality of cameras can comprise a plurality of fields of view, which comprise a plurality of camera optical axes. The plurality of camera optical axes can define a plurality of intersection points with the path. Where consecutive intersection points are distanced from each other along the path predetermined distances which are based on the expected speed of the object and the time frame T.

In an exemplary embodiment, the controller is configured to simultaneously initialize the capturing by the first camera and the second camera.

This embodiment can be advantageous for ensuring a synchronized output of frames by at least both cameras. In an exemplary embodiment, the plurality of cameras along the path are initialized simultaneously, resulting in the continuous recording by each camera which enables the system to capture frames of each object along the entire path and output individual videos of each object simultaneously.

The controller may incorporate advanced synchronization features including, but not limited to:

- precision timing systems using dedicated timing hardware or network synchronization protocols to ensure frame-level synchronization across all cameras in the array;
- adaptive frame rate control that dynamically adjusts capture timing based on real-time object tracking and velocity measurements;
- automatic calibration systems that periodically verify and adjust camera synchronization to maintain optimal performance over extended operation periods; and
- quality monitoring systems that continuously assess video quality, tracking accuracy, and system performance, providing alerts and automatic adjustments when performance degrades.

In an exemplary embodiment the controller may be configured to simultaneously initialize the capturing the plurality of cameras.

Additional embodiments of the system of the invention may include:

- modular camera deployment systems that enable rapid setup and reconfiguration of camera arrays for different events, paths, or tracking requirements;
- integration capabilities with existing broadcasting infrastructure, including, but not limited to, support of multiple output video formats and real-time streaming capabilities as well as compatibility with standard video formats, streaming protocols, and broadcast equipment;
- storage and archival systems for captured video data, including automatic cataloging, indexing, and retrieval capabilities for post-event analysis;
- real-time streaming capabilities that enable live broadcast of tracked video while simultaneously recording for later processing and distribution;
- scalable system architectures that support expansion from small installations with minimal cameras to large installations covering extensive paths with numerous cameras; and secondary control systems and automatic failure detection systems to ensure continued operation during individual camera or communication failures.

It should be appreciated that a method for generating a continuously tracked video output of a movable object along a path from a tracking system, wherein the system comprises:

- a plurality of cameras positioned at a predetermined intervals along the path, wherein the predetermined intervals are calculated based on expected object velocity characteristics and desired video frame rate requirements,
- at least a first camera of the plurality of cameras and a second camera of the plurality of cameras are each configured to capture frames containing the object within respective time intervals;
- controller configured to control at least the first camera and the second camera and to perform real-time processing of captured frame data;

wherein the method comprises the following steps

- calculating optimal camera positioning along the path based on expected object velocity and desired frame rate;
- calibrating camera timing and synchronization across the plurality of cameras;

- capturing a first frame by the first camera where the object is displayed in the first frame;
- capturing a second frame by the second camera within a predetermined time interval where the object is displayed in the second frame;
- processing captured frames to identify and track the object using computer vision techniques;
- selecting optimal frames from available camera data based on object position, image quality, and timing requirements; and compiling an output video comprising at least the first and second frame in a seamless sequence that provides continuous tracking visualization.

The method embodiments thus far described may include any of the following features:

- a method for adaptive tracking comprising the steps of: monitoring real-time object velocity; comparing actual velocity to predicted velocity; dynamically selecting cameras for frame capture based on velocity variations; and adjusting compilation timing to maintain seamless video continuity;
- a method for multi-object tracking comprising the steps of: identifying multiple objects within captured frames; assigning unique identifiers to each tracked object; maintaining separate tracking sequences for each object; and generating individual continuous video outputs for each tracked object;
- a method for quality optimization comprising the steps of: analyzing captured frames for focus, lighting, and composition quality; scoring frame quality using automated assessment algorithms; prioritizing high-quality frames for video compilation; and applying enhancement processing to improve overall video quality; and
- a method for predictive tracking comprising the steps of: analyzing historical object movement patterns; generating predictive models for object behavior; pre-positioning camera selection based on predictive models; and continuously updating predictions based on real-time tracking data.

These and other features and advantages of the invention will be apparent from the description of the preferred, but not exclusive, embodiments, which are illustrated by way of non-limiting example in the accompanying drawings.

BRIEF DESCRIPTION OF THE FIGURES

The above and other advantages and features will be more fully understood following this detailed description of some example embodiments with reference to the attached drawings. These should be considered illustrative and not limiting.

DETAILED DESCRIPTION OF THE PREFERRED EMBODIMENT

In the following detailed description, numerous specific details are presented in the form of examples to provide a thorough understanding of the relevant teachings. However, it will be apparent that the system and method described herein can be practiced without such details.

All the figures refer to a same embodiment of the present invention without this embodiment being limiting.

Figure 1:
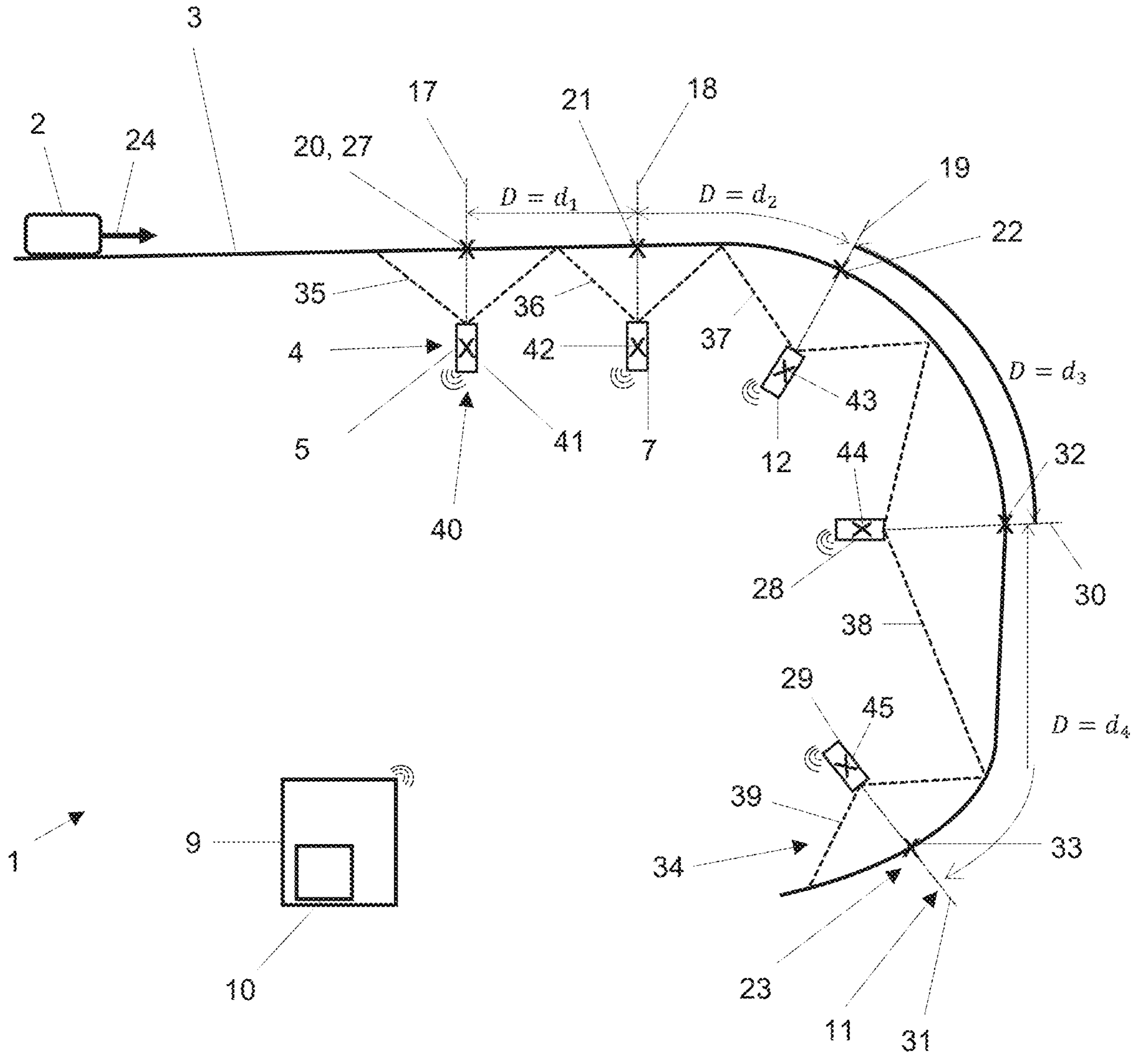
FIG. 1 is a schematic top-view of an example tracking system of the invention that comprises five cameras installed along a path.

As seen in FIG. 1, the illustrated embodiment provides an example tracking system 1 for generating a continuously tracked video output of a movable object 2 that defines a direction of travel 24 along a path 3. The tracking system 1 comprises a plurality of cameras 4, namely, a first camera 5, a second camera 7, a third camera 12, a fourth camera 28, and a fifth camera 29. The plurality of cameras 4 defines a plurality of geometric centers 40, namely, a first geometric center 41, a second geometric center 42, a third geometric center 43, a fourth geometric center 44, and a fifth geometric center 45.

As seen in FIG. 1, the plurality of cameras 4 also comprises a plurality of fields of view 34, namely, a first field of view 35, a second field of view 36, a third field of view 37, a fourth field of view 38, and a fifth field of view 39. The plurality of fields of view 34 are oriented towards the path 3 and project from a same side of the path 3. In another embodiment (not shown), the fields of view of a plurality of cameras can project towards the path from either side of the path and/or above the path as long as a continuous shot effect of the object is achieved in the output video. The plurality fields of view 34 comprise a plurality of camera optical axes 11, namely, a first camera optical axis 17, a second camera optical axis 18, a third camera optical axis 19, a fourth optical axis 30, and a fifth optical axis 31. The plurality of camera optical axes 11 intersect with the path 3 such that a plurality of intersection points 23 is defined, namely, a first intersection point 20, a second intersection point 21, a third intersection point 22, a fourth intersection point 32, and a fifth intersection point 33.

It is generally understood that, in order to calculate the predetermined distance D of the plurality of cameras 4 along the path 3, a starting location should be chosen. In FIG. 1, a start point 27 is defined. It can be defined arbitrarily, or, for example, as the location where a race starts. In the case of a Formula 1, this starting location may be chosen as the pole position, that is, the first position on the starting grid. The first intersection point 20 has been configured to match with the start point 27. The predetermined distance D of the second intersection point 21 along the path 3 and downstream from the first intersection point 20, is a function of an expected speed V of the object 2 downstream the first intersection point 20 within a time frame T. The time frame T is the inverse of a desired projection system frame rate. The predetermined distance D of the third intersection point 22 along the path 3 and downstream from the second intersection point 21, is a function of an expected speed V of the object 2 downstream the second intersection point 21 within the time frame T. The predetermined distance D of the fourth intersection point 32 along the path 3 and downstream from the third intersection point 22, is a function of an expected speed V of the object 2 downstream the third intersection point 22 within the time frame T. The predetermined distance D of the fifth intersection point 33 along the path 3 and downstream from the fourth 32, is a function of an expected speed V of the object 2 downstream the fourth intersection point 32 within the time frame T.

With regard to the tracking system 1 of FIG. 1, the predetermined distance D along the path 3 of the second intersection point 21 downstream from the first intersection point 20 is calculated as the product between the expected speed V of the object 2 downstream the first intersection point 20 within the time frame T multiplied by the time frame T, and, results in $d_1$. The predetermined distance D along the path 3 of the third intersection point 22 downstream from the second 21 is calculated as the product between the expected speed V of the object 2 downstream the second intersection point 21 within the time frame T multiplied by the time frame T, and, results in $d_2$. The predetermined distance D along the path 3 of the fourth intersection point 32 downstream from the third intersection point 22 is calculated as the product between the expected speed V of the object 2 downstream the third intersection point 22 within the time frame T multiplied by the time frame T, and, results in $d_3$. The predetermined distance D along the path 3 of the fifth intersection point 33 downstream from the fourth intersection point 32 is calculated as the product between the expected speed V of the object 2 downstream the fourth intersection point 32 within the time frame T multiplied by the time frame T, and, results in $d_4$.

These distances, $d_1$, $d_2$, $d_3$, and $d_4$ between consecutive intersection points of the plurality of intersection points 40, ensure that the object 2 will pass by the respective camera field of view when a frame is required by the projection system according to the projection system frame rate supposing the object 2 travels at the expected speeds V. Additionally, as seen in FIG. 1, the plurality of geometric centers 40 are separated from the path a fixed perpendicular distance from the path, and the plurality of fields of view 34 are substantially similar among the plurality of cameras 4 although this is not reflected graphically in FIG. 1 to improve the readability.

As can be seen in FIG. 1, the tracking system 1 also comprises a controller 9, which is connected to the plurality of cameras 4, either wired or wirelessly.

Figure 2:
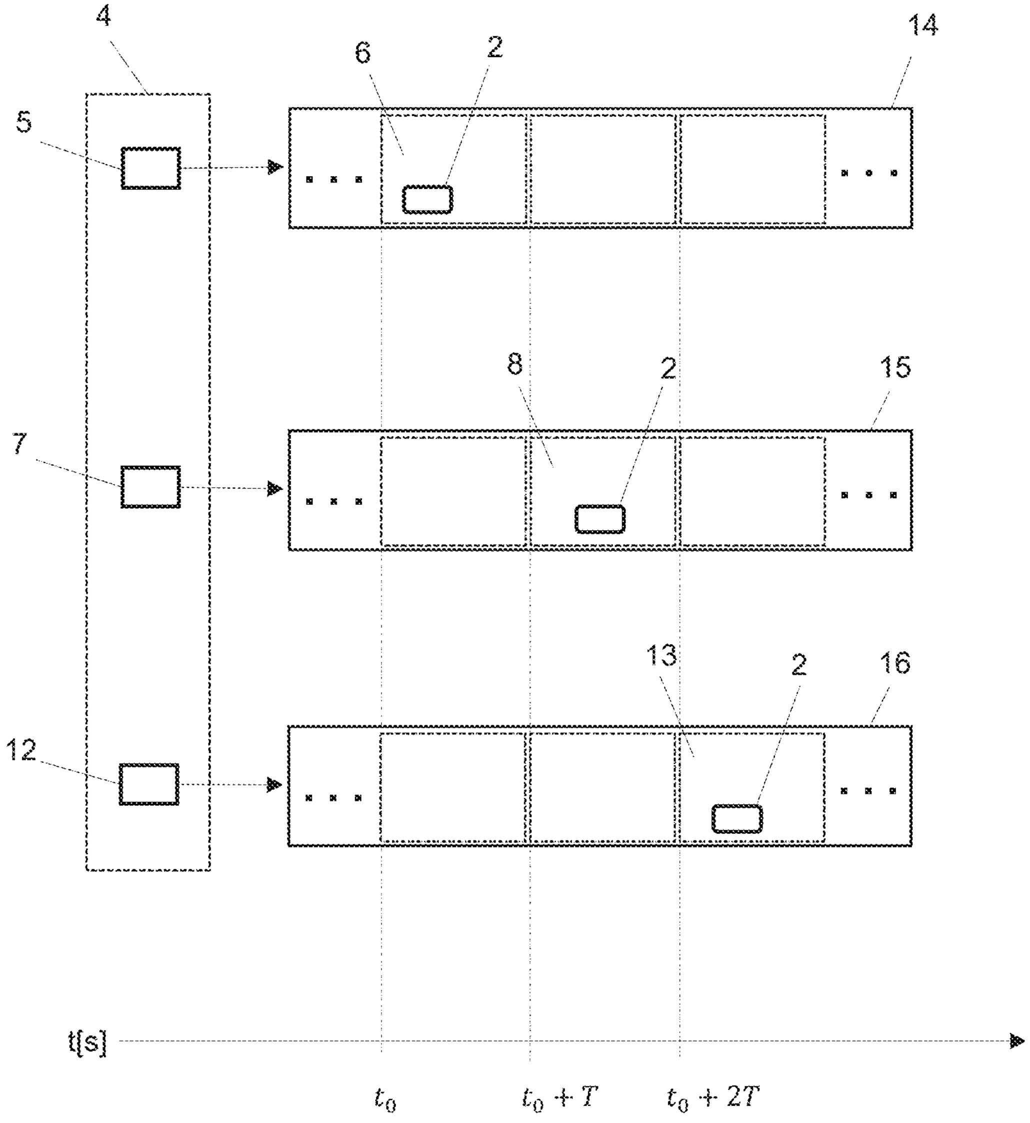
FIG. 2 is a schematic representation of the captured frames output by three of the five cameras of the example tracking system of the invention associated with a linear time axis in a first scenario.

According to FIG. 2, the object 2 travels along the path 3 according to the expected speed V downstream from each of the plurality of geometric centers 40. The plurality of cameras have been initialized simultaneously such that the cameras all generate continuous video output. In particular, the first camera 5 generates a first video 14, one frame of which is the first frame 6 where the object 2 is displayed defining a time $t_0=0$ [s]. The second camera 7 generates a second video 15, one frame of which is the second frame 8 where the object 2 is displayed. The second frame 8 is captured within a time frame T from the first frame 6, that is, at time $t_0+T$ [s]. The third camera 12 generates a third video 15, one frame of which is the third frame 13 where the object 2 is displayed. The third frame 13 is captured within a time frame T from the second frame 6, that is, at time $t_0+2T$ [s]. The controller 9 is configured to receive from the first camera 5, the second camera 7, and the third camera 12 the first frame 6, the second frame 8 and the third frame 13, respectively, and the controller 9 is configured to compile an output video comprising the first frame 6, the second frame 8 and the third frame 13.

In FIG. 1, it is shown that the controller 9 comprises an AI model 10 configured to identify the object 2 within the first frame 6, the second frame 8 and the third frame 13. It is also shown that the plurality of camera optical axes 11 are oriented at approximately 90° with respect to the path 3 from a bird's a view. This orientation allows the generation of output videos by the tracking system 1 that achieve a continuous shot effect and a subject-mounted perspective effect perpendicular to the object 2, similar to a dolly camera travelling parallel to the object 2.

Figure 3:
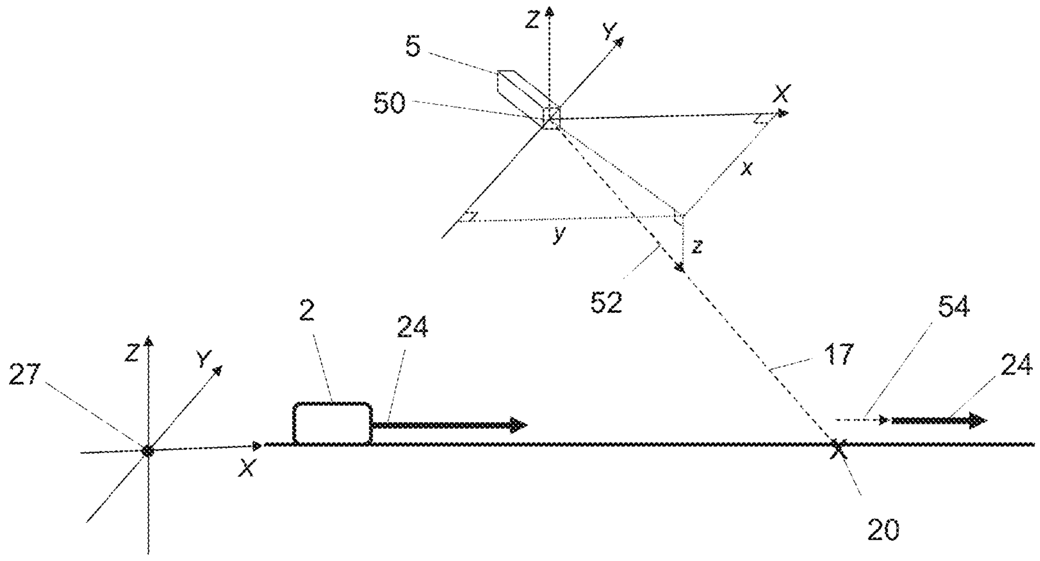
FIG. 3 is a schematic view of a camera with its corresponding optical axis orientation measured by using a local UCS set to zero in the lens geometric center origin of the camera.

In FIG. 3, a possible way for defining the orientation of plurality of camera optical axes 11 is shown. In first place, a global universal coordinate system UCS has been defined with the origin 0,0,0 thereof centered the starting location 27. The XY plane of the global UCS represents a horizontal plane and the z-axis represents elevation. The first camera 5 defines a first lens geometric center 50 from which the first camera optical axis 17 extends until intersecting the path 3 at the first intersection point 20. A first local UCS, with the same orientation as the global UCS, is represented with origin centered at the first lens geometric center 50. The first camera optical axis 17 defines a first unit optical axis direction vector 52 and the direction of travel 24 defines a first unit direction of travel vector 54 at the first intersection point 20. In FIG. 3*a*, the first camera optical axis 17 has been oriented such that the angle of the first camera optical axis 17 forms with the first unit direction of travel vector 54 is acute. This orientation ensures that as the object 2 travels past the first intersection point 20 a rear part of the object 2 is visible.

The plurality of camera optical axes 11 can be oriented such that each unit optical axis direction vector and its corresponding unit direction of travel vector defined at each intersection point is acute or obtuse depending on what view of the object 2 is desired. When the angle is acute, a rear view of the object is achieved and when the angle is obtuse a frontal view of the object is achieved.

A tracking system for generating a continuously tracked video output of a movable object along a path may comprise:

- a first camera configured to capture at least a first frame comprising the object;
- a second camera positioned downstream from the first camera along the path and configured to capture at least a second frame comprising the object at a predetermined time interval after the first frame;
- additional cameras positioned along the path and configured to capture additional frames as the object moves along the path;
- a controller configured to receive the frames and compile a continuous video output comprising the frames in a temporal sequence, wherein consecutive ones of the frames in the video output are captured by different ones of the cameras positioned sequentially along the path;
- wherein positioning of the cameras along the path is determined based on expected velocity characteristics of the object and a desired frame rate for the video output.

The cameras along the path may be separated a predetermined distance which is a function of the desired frame rate selected The positioning of consecutive cameras may be calculated using a relationship D=V×T, where D represents a predetermined distance between the cameras along the path, V represents an expected object velocity, and T represents a time interval corresponding to the desired frame rate.

The controller may comprise an artificial intelligence model configured to identify the object within captured ones of the frames and track the object across multiple views of the cameras.

The artificial intelligence model may be configured to distinguish between multiple objects within the frames and generate separate continuous video outputs for different tracked objects.

The artificial intelligence model may comprise predictive algorithms that anticipate movement of the object and optimize capture timing of the frames.

The artificial intelligence model may be configured to apply video enhancement processing including motion blur effects to background areas while maintaining focus on the object tracked, thereby enhancing the visual sensation of following the object along the path.

The first camera or the second camera may be positioned at varying angles relative to the path to provide different viewing perspectives of the object.

The controller may be configured to dynamically select the cameras for the captured frames based on real-time velocity measurements of the object.

The cameras may be selected from a group of cameras consisting essentially of digital cameras, high-speed cameras, infrared cameras, or any combination thereof suitable for intended applications and environmental conditions.

The system may be configured to adapt positioning calculations of the cameras based on path geometry including straight sections, curves, and elevation changes.

The system may support multiple formats of the output video and real-time streaming capabilities.

Positioning of the cameras may be determined using at least one of historical velocity data, real-time tracking data, predictive modeling, or machine learning algorithms.

The controller may include integration capabilities with existing broadcasting infrastructure and supports standard video formats and streaming protocols.

The cameras may be configured in a modular deployment system enabling rapid setup and reconfiguration for different events and configurations of the path.

The system may include secondary control systems and automatic failure detection systems to ensure continued operation during failure of individual ones of the cameras or communication.

A computer-implemented method for generating a continuously tracked video output of a movable object along a path may comprise the steps of:

- calculating optimal camera positioning along the path based on expected velocity of the object and desired frame rate;
- positioning a plurality of cameras at the calculated positions with fields of view oriented toward the path;
- synchronizing frame capture timing across the plurality of cameras;
- capturing frames by the plurality of cameras as the object moves through respective fields of view of the cameras, wherein consecutive one of the frames in the video output are captured by different ones of the cameras positioned sequentially along the path;
- processing the captured frames to identify the object using computer vision techniques;
- compiling the captured frames from the plurality of cameras into a continuous sequence wherein substantially each one of the frames originates from a different one of the cameras; and
- outputting the continuous video sequence as seamless tracking footage of the object.

The method may further comprise the steps of monitoring real-time velocity of the object and dynamically adjusting camera selection from the plurality of cameras based on velocity variations from expected values.

The method may further comprise the steps of identifying multiple objects, including the object, within the captured frames and generating separate continuous video outputs for each one of the objects using the plurality of cameras.

The step of calculating optimal camera positioning may use a relationship D=V×T, where D represents a predetermined distance between consecutive one of the cameras, V represents an expected object velocity at a location of the cameras, and T represents a time interval corresponding to the desired frame rate.

The method may further comprise the step of analyzing the captured frames for quality assessment and prioritizing high-quality ones of the frames for video compilation.

The method may further comprise the step of applying predictive algorithms to anticipate movement of the object and pre-position camera selection of the plurality of cameras for optimal timing the captured frames.

The method may further comprise the step of applying predictive algorithms to anticipate movement of the object and pre-position camera selection of the plurality of cameras for optimal timing the captured frames.

A non-transitory computer-readable storage medium storing instructions that, when executed by a processor, cause the processor to perform operations comprising the steps of:

- receiving video frame data from a plurality of cameras positioned along a path at predetermined intervals calculated based on an expected velocity of the object and a desired frame rate;
- analyzing the video frame data to identify the object as a target within frames of the video frame data using computer vision processing;
- determining optimal selection timing of the frames based on movement of the object and rate requirements of the frames;
- compiling selected ones of the frames from different ones of the cameras into a continuous video sequence that provides seamless tracking of the object; and generating output video data in a format suitable for broadcasting or display.

The operations may further comprise the steps of

- monitoring real-time velocity of the object and comparing monitored real-time velocity to predicted velocity values;
- dynamically adjusting selection of the cameras based on velocity variations; and
- applying quality assessment algorithms to optimize selection of the frames for video compilation.

The invention claimed is:

1. A tracking system for generating a tracked video output of a movable object along a path, the tracking system comprising:

- a plurality of cameras positioned along the path having a field of view oriented toward the path, the plurality of cameras comprising at least:
  - a first camera configured to capture at least a first frame that is from a plurality of frames and that depicts the movable object;
  - a second camera positioned downstream from the first camera along the path and configured to capture at least a second frame that is from the plurality of frames and that depicts the movable object at a time interval after the first frame, a distance between the first camera and the second camera being determined based on (1) an intersection between (i) an optical axis associated with the first camera and (ii) a first point on the path, (2) an intersection between (i) an optical axis associated with the second camera and (ii) a second point on the path, (3) an expected velocity characteristic of the movable object, and (4) a desired frame rate for the tracked video output, the first point on the path and the second point the path defining a geometry of the path that includes at least one of a straight section of the path, a curve in the path, or an elevation change of the path; and a controller configured to receive the plurality of frames and compile the tracked video output comprising the plurality of frames in a temporal sequence.

2. The tracking system of claim 1, wherein each camera from the plurality of cameras is separated from a remaining camera from the plurality of cameras by the distance that is based on the desired frame rate.

3. The tracking system of claim 1, wherein the distance is calculated based on an expected object velocity and a time interval associated with the desired frame rate.

4. The tracking system of claim 1, wherein the controller comprises an artificial intelligence model configured to identify the movable object within the plurality of frames and track the movable object across multiple views of the plurality of cameras.

5. The tracking system of claim 4, wherein the artificial intelligence model is configured to distinguish between multiple objects within the plurality of frames and generate separate continuous video outputs for different tracked objects.

6. The tracking system of claim 4, wherein the artificial intelligence model is configured to anticipate movement of the movable object to define a capture timing of the plurality of frames.

7. The tracking system of claim 4, wherein the artificial intelligence model is configured to apply video enhancement processing including motion blur effects to background areas while maintaining focus on the movable object, thereby enhancing a visual sensation of following the movable object along the path.

8. The tracking system of claim 1, wherein the first camera and the second camera are positioned at varying angles relative to the path to provide different viewing perspectives of the movable object.

9. The tracking system of claim 1, wherein the controller is configured to dynamically select a camera from the plurality of cameras to capture at least one frame from the plurality of frames, based on real-time velocity measurements of the movable object.

10. The tracking system of claim 1, wherein the plurality of cameras includes at least one of a digital camera, a high-speed camera, or an infrared camera.

11. The tracking system of claim 1, wherein the controller supports at least one of multiple formats of the tracked video output or real-time streaming capabilities.

12. The tracking system of claim 1, wherein positioning of the plurality of cameras is determined using at least one of historical velocity data, real-time tracking data, predictive modeling, or machine learning algorithms.

13. The tracking system of claim 1, wherein the controller is compiles the tracked video output to produce video data being associated with a predefined video format and a predefined streaming protocol.

14. The tracking system of claim 1, further including secondary control systems and automatic failure detection systems to ensure continued operation during failure of at least one of a camera from the plurality of cameras or communication within the tracking system.

15. A non-transitory, processor-readable medium storing instructions that, when executed by a processor, cause the processor to:

receive, from a first camera, a first frame that depicts an object at a first location;

receive, from a second camera, a second frame that depicts the object at a second location, a distance between the first camera and the second camera being determined based on (1) an intersection between (i) an optical axis associated with the first camera and (ii) a first point on a path defined by the first location and the second location, (2) an intersection between (i) an optical axis associated with the second camera and (ii) a second point on the path, and (3) a predicted motion of the object, the first point on the path and the second point the path defining a geometry of the path that includes at least one of a straight section of the path, a curve in the path, or an elevation change of the path; and generate, based on the first frame and the second frame, video data that depicts the object in motion between the first location and the second location.

16. The non-transitory, processor-readable medium of claim 15, further storing instructions to cause the processor to:

blur a background depicted in the first frame without blurring the object depicted in the first frame; and blur a background depicted in the second frame without blurring the object depicted in the second frame, to cause the video data to depict a motion effect associated with the object in motion between the first location and the second location.

17. The non-transitory, processor-readable medium of claim 15, wherein the object is a first object, and the video data is first video data, the non-transitory, processor-readable medium further storing instructions to cause the processor to:

receive an indication of a motion pattern associated with a plurality of objects that includes the first object;

based on the motion pattern, determine a number of frames to be captured by at least one of the first camera or the second camera;

cause the at least one of the first camera or the second camera to capture the number of frames that each depicts a second object; and select a frame from the number of frames to produce second video data that depicts the second object in motion between the first location and the second location.

18. The non-transitory, processor-readable medium of claim 15, wherein:

an orientation of the first camera is based on a predetermined angle between an optical axis of the first camera and a path associated with the first location and the second location; and an orientation of the second camera is based on a predetermined angle between an optical axis of the second camera and the path.

* * * * *